United States Patent [19]
Alig et al.

[11] Patent Number: 5,374,415
[45] Date of Patent: Dec. 20, 1994

[54] METHOD FOR FORMING CARBON FIBERS

[75] Inventors: Robert L. Alig, Dayton, Ohio; Gary G. Tibbetts, Birmingham; Daniel W. Gorkiewicz, Washington, both of Mich.

[73] Assignee: General Motors Corporation, Detroit, Mich.

[21] Appl. No.: 13,266

[22] Filed: Feb. 3, 1993

[51] Int. Cl.$^5$ ............................................. D01F 9/127
[52] U.S. Cl. .................................................. 423/447.3
[58] Field of Search ..................................... 423/447.3

[56] References Cited

U.S. PATENT DOCUMENTS

| | | | |
|---|---|---|---|
| 2,796,331 | 6/1957 | Kauffman et al. | 423/447.3 |
| 4,572,813 | 2/1986 | Arakawa | 423/447.3 |
| 4,876,078 | 10/1989 | Arakawa et al. | 423/447.3 |
| 5,024,818 | 6/1991 | Tibbetts et al. | 422/158 |
| 5,102,647 | 4/1992 | Yamada et al. | 423/447.3 |

FOREIGN PATENT DOCUMENTS

| | | | |
|---|---|---|---|
| 61-146816 | 7/1986 | Japan | 423/447.3 |
| 62-57926 | 3/1987 | Japan | 423/447.1 |
| 01040621 | 2/1989 | Japan | 423/447.3 |

OTHER PUBLICATIONS

A. V. Krasnobryzhii et al, Vysokomolekulyarnye Soedineniya, Kratkie Soobshcheniya, B, 30, No. 8, Aug. 1988, p. 617.

Pending U.S. application Ser. No. 07/709,259 filed Jun. 3, 1991.

T. Kato et al, Journal of Materials Science Letters 11, (1992), 674–677 (no month).

T. Matsuda et al, Carbon 30, 124, 1992 (no month).

*Primary Examiner*—Gary P. Straub
*Assistant Examiner*—Stuart L. Hendrickson
*Attorney, Agent, or Firm*—George A. Grove

[57] ABSTRACT

In a preferred embodiment, an apparatus and method for forming carbon fibers in a gas phase reaction is disclosed wherein a reactor defines a reaction chamber with a closed end and an outlet, and a reactant feed tube which extends generally axially therewithin. Gaseous reactants are injected into the reactor through an opening of the feed tube. Preferred reactants include methane, natural gas, hydrogen sulfide, ammonia, and an iron-containing compound dispersed in a carrier gas. The apparatus includes purge means for intermittently and forcibly moving any fibers clogging the reactor out of the reactor; and means for intermittently oxidizing carbonaceous material in the reactor. In use, a period of fiber formation is followed by one or more purge steps to essentially cleanse the reactor.

14 Claims, 2 Drawing Sheets

5,374,415

METHOD FOR FORMING CARBON FIBERS

FIELD OF THE INVENTION

This invention relates to forming carbon fibers and more particularly to a method for making carbon fibers in a gas phase reaction.

BACKGROUND OF THE INVENTION

Carbon fibers are used to make composite materials. Such carbon composites provide the advantages of relatively high stiffness and strength, and low weight as compared to other materials commonly used to form articles such as automotive, boat, airplane and other parts. High stiffness and low weight are key advantages needed to reduce vehicle fuel consumption and increase fuel economy. The stiffness of the composite is directly related to the quality (graphitic nature) of the carbon fibers. Preferred fibers have basal planes arranged in concentric cylinders with respect to the fiber axis and are of microscopic size for improved stiffness-to-weight ratio. Such microscopic fibers effectively achieve the advantages of strength at a relatively low weight. When conventional materials are replaced with composite fiber materials, fuel economy is improved.

In U.S. Pat. No. 5,024,818, issued to the assignee of the present invention, Tibbetts et al described a new vertical reaction chamber and a new method for forming the fibers.

In pending U.S. application Ser. No. 07/709,259, Tibbetts et al described a new horizontal reaction chamber and still other new methods. These new methods and reactors improved fiber quality and improved production efficiency. However, it is desirable to achieve even better fiber quality and enhance production efficiency.

SUMMARY OF THE INVENTION

In a preferred process, carbon fibers are formed in a gas phase reaction in a reactor by first forming a mixture comprising a gaseous hydrocarbon, ammonia and a compound decomposable to form nuclei. Next, the mixture is heated in the reactor for a time and at a temperature sufficient to decompose or pyrolyze the decomposable compound to form catalytic nuclei which induce growth of carbon fibers and to thereby form carbon fibers, and then the fibers are substantially continuously recovered from the reactor. Desirably, the gaseous hydrocarbon is at least one selected from the group consisting of methane, ethane, propane, ethylene, acetylene, natural gas and vaporizable hydrocarbons, and preferably is methane or a high methane natural gas. The decomposable compound is preferably iron pentacarbonyl dispersed in a carrier gas. Preferably, a sulfur-containing gaseous compound, such as hydrogen sulfide, is included in the mixture, and hydrogen sulfide has a mass at least as great as the mass of the iron in the decomposable compound. Preferred proportions of methane and ammonia provide a ratio of carbon (C) to nitrogen (N) in a range of about 1:1 to about 3:1.

In one embodiment, the method of the invention includes intermittently purging the reactor by intermittently interrupting the flow of the reactant gases and, during the interruption, conducting a forced purge by flowing a gas substantially devoid of carbonaceous material through the reactor at a pressure sufficient to forcibly move at least a portion of any of the fibers plugging the reactor out of the reactor, and conducting an oxidation purge by flowing an oxygen-containing gas through the reactor for a time and at a temperature sufficient to oxidize at least a portion of any unreacted or partially reacted carbonaceous material in the reactor. In addition, the oxidation also assists in reheating the reaction zone. In one alternative, the forced and oxidation purges are conducted simultaneously using pressurized air supplied in short bursts. In another alternative, the forced purge is conducted using a pressurized inert gas and then the oxidation purge immediately follows.

The invention provides fibers of high quality formed when ammonia is included in the reactant gas mixture. Such fibers have an apparent bulk density less than 0.001 grams per centimeter (gm/cc) and a low as 0.0001 to 0.00005 gm/cc. In more basic terms, a pound of fibers formed without ammonia occupies about 10 cubic feet of volume, whereas a pound of fibers formed with ammonia occupies about 50 cubic feet. Fibers formed with ammonia also have greater length and more uniform diameters than fibers formed with only the carbonaceous (hydrocarbon), nuclei, and sulfide constituents. Under one set of controlled conditions, fibers were formed having diameters in a relatively narrow range, that is, 0.19 to 0.22 microns, with a standard deviation of only up to 0.05 microns. Depending on the conditions selected, it is possible to form fibers having diameters as small as 0.05 or as large as 0.5 microns. The low bulk density, greater length, and relatively uniform diameters of these fibers will improve their ability to mechanically reinforce composite materials, or add electrical or thermal conductivity.

These and other objects, features, and advantages will become apparent from the following description of the preferred embodiments, appended claims and accompanying drawings.

DETAILED DESCRIPTION OF THE PREFERRED EMBODIMENTS

Carbon fibers are formed in a gas phase reaction by first forming a mixture comprising a gaseous hydrocarbon, a compound decomposable to form nuclei and ammonia. Next, the mixture is heated in the reactor for a time and at a temperature sufficient to decompose the decomposable compound to form nuclei which induce growth of carbon fibers and to thereby form carbon fibers, and then the fibers are substantially continuously recovered from the reactor. Desirably, the gaseous hydrocarbon (carbonaceous compound) is at least one selected from the group consisting of methane, ethane, propane, ethylene, natural gas, and vaporizable hydrocarbons, and preferably is methane or a high methane natural gas. The decomposable compound is preferably iron pentacarbonyl dispersed in a carrier gas. Preferably, a sulfur-containing gaseous compound, such as hydrogen sulfide, is included in the mixture with the number of hydrogen sulfide molecules at least as great as the number of atoms of the iron in the decomposable compound. Preferred proportions of methane and ammonia provide a ratio of carbon (C) to nitrogen (N) in a range of about 1:1 to about 3:1.

The best fibers are formed using a reactor which includes means for intermittently purging unreacted constituents.

Figure 1:
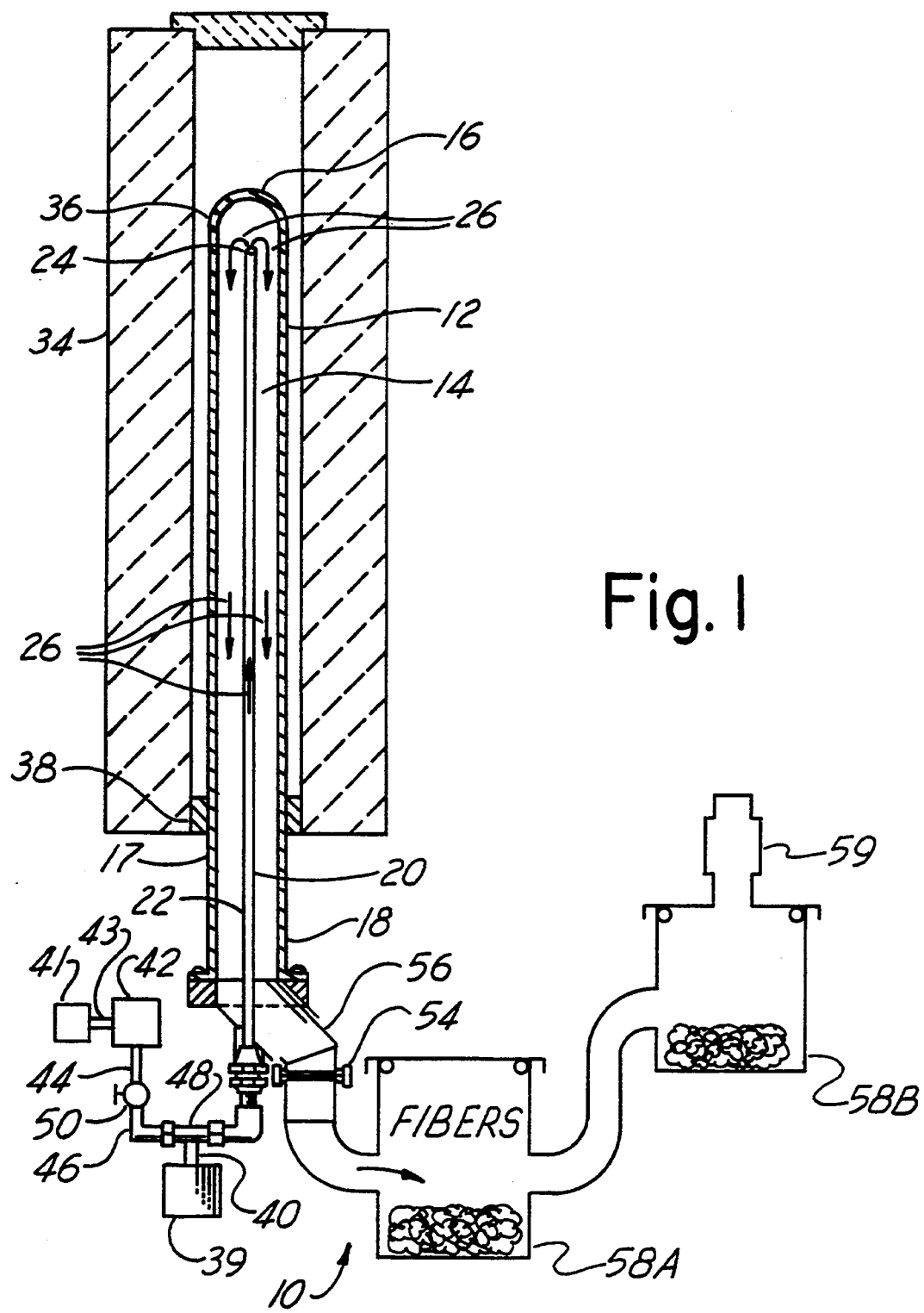
FIGS. 1 and 2 are diagrammatic cross-sectional views of reactors used in the method of the invention.
Figure 2:
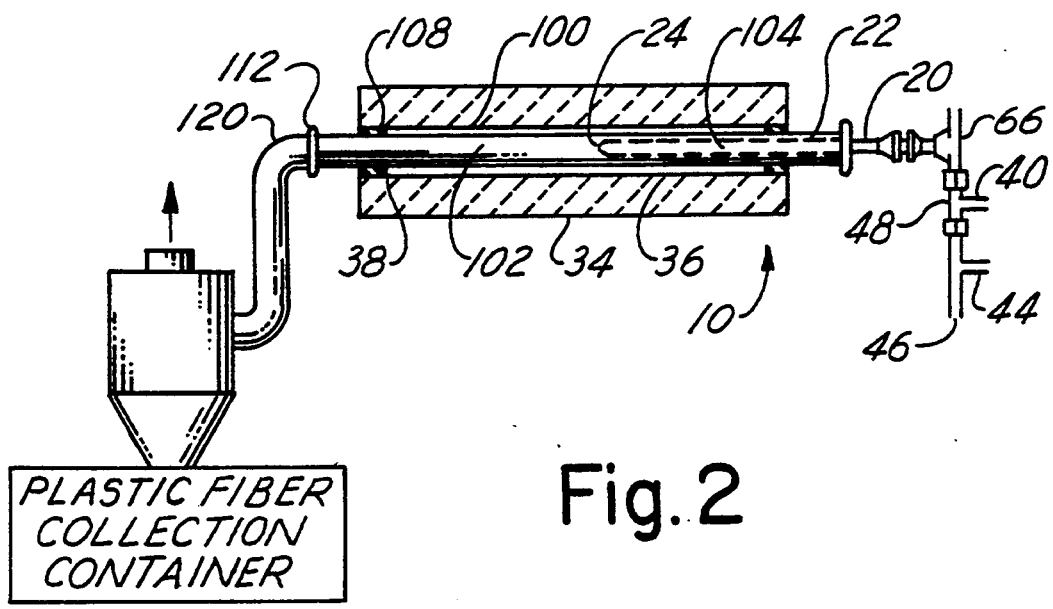

FIGS. 1 and 2 illustrate two preferred embodiments of an apparatus 10 for forming carbon fibers by a continuous gas phase process. The embodiments of the apparatus are described in U.S. Pat. No. 5,024,818, issued to Tibbetts et al. Main components of apparatus 10 and its method of use in forming carbon fibers from methane, ammonia, hydrogen sulfide, and iron carbonyl will now be described. As shown in FIG. 1, apparatus 10 includes a reactor 12 defining a chamber 14 with an axis, a first end 16 which is closed and a second end 17 with an outlet 18. Gaseous reactants are injected into the reactor 12 by a reactant feed tube 20 which is disposed in the chamber 14 and extends generally axially therein. The feed tube 20 has an inlet 22 at one end and a discharge opening 24 at the other end spaced from the reactor closed end 16. The opening 24 of the feed tube 20 is adjacent the closed end 16, and the feed tube 20 extends more than ¼ of the axial length of the reactor. Desirably, the feed tube extends at least ½ of the axial length of the reactor and preferably ¾ of the length thereof.

A gas flow path or passageway 26, defined by the gas feed tube 20 and reactor 12, extends generally axially through the feed tube 20 into the chamber 14 and thereafter generally axially through the chamber 14.

In order to provide desired conditions for microscopic fiber growth, the reaction chamber 14 has an average cross-sectional area substantially greater than the average cross-sectional area of the feed tube.

The apparatus may be operated using vaporizable liquid reactant as described in our U.S. Pat. No. 5,024,818. However, we have found best results are achieved using gaseous reactants and/or liquid reactants entrained in a gas stream.

In order to supply the necessary heat for the reaction, the apparatus 10 has heating means such as a heater or furnace 34 to heat the reactor 12 to establish a hot zone 36 within the chamber 14 adjacent the closed end 16. The temperature of the hot zone 36 is sufficient to sustain carbon fiber growth. There is a relatively cool zone 38 adjacent the reactor outlet 18. Desirably, the inlet 22 is at an ambient temperature, the hot zone 36 is at a temperature greater than 1000° C. and the outlet 18 is at a temperature between ambient and 1000° C. Preferably, a temperature over 1050° C. is maintained near zone 36.

The reactor 12 and feed tube 20 are each constructed of a material which is relatively resistant to heat and corrosion. Suitable materials include nickel or high temperature steel, quartz, ceramic, and refractory materials. Desirably, a refractory such as alumina or mullite is used.

The apparatus 10 comprises means for continuously supplying a gaseous reactant stream into the feed tube 20 at a rate sufficient to entrain the nuclei within the stream and disperse the nuclei into the reactor hot zone 36. Preferably, pressurized or compressed natural gas ($CH_4$) is used, supplied from compression and flow control system 39, and then through line 40. Preferably, ammonia is included with the natural gas. Specifically, the gaseous reactant stream must move at a velocity sufficient to entrain the nuclei within the gas stream for dispersion into the reactor hot zone 36. Since it is desired to supply nuclei entrained in a gas stream at inlet 22 of feed tube 20, a pressurized gas is supplied from compression and flow control system 41. The gas is then bubbled through a reservoir 42 which holds a liquid, such as iron carbonyl, from which nuclei may be formed. Line 43 connects system 41 to reservoir 42. This forms a gas/organometallic mixture which is then supplied from reservoir 42 through line 44 by gas pressure, and then through line 46 to tee 48 where it mixes with gas in line 40 before entering feed tube 20 at inlet 22. Valve 50 is between lines 44 and 46.

As shown in FIG. 1, the apparatus in one embodiment includes means to move any remaining fibers out of the reactor in a forced purge step. The forced purge step immediately follows a period of fiber formation. Preferably the forced purge uses pressurized gas such as air, helium, nitrogen, or argon supplied in short bursts from compression and flow control system 39, and then through feed tube 20. When air is used to purge, it is supplied in short bursts of pressure over a period of about 1 to 2 minutes. The air also acts to oxidize any carbonaceous residue in the reactor. When a non-oxygen containing gas is used for the forced purge, an oxidation purge preferably follows, as described below. Alternatively, the forced purge may include use of mechanical means such as turning screw or brush to ream the remaining fibers out of the reactor, or a moving, jointed belt to accomplish the same end.

If it is desired to oxidize carbonaceous material remaining after a forced purge, then an oxidation purge may immediately follow. The oxidation purge is particularly useful to remove excessively long fibers which may have grown into a matrix formation, thus plugging the opening 24 of the feed tube 20. Air is supplied from compression and flow control system 39, and then through feed tube 20 for a period of time sufficient to oxidize fibers and other oxidizable constituents from surfaces of the feed tube 20 and reactor 12.

The reactor 12 includes means for collecting carbon fibers from exhaust gas exiting the outlet 18, through exhaust line 56, which desirably comprises first and second collection vessels 58A, 58B, and at least one filter 59 for trapping the microscopic carbon fibers.

As shown in FIG. 2, the reactor 100 is disposed generally horizontally. The reactor 100 defines a chamber 102 with an axis and first and second ends 104, 108. The inlet 22 of feed tube 20 enters through a first end 104 which is closed and the tube 20 extends axially toward the second end 108. Second end 108 has an outlet 112 joined to an exhaust line 120. The outlet 112 is distal of the inlet 22 of feed tube 20. A relatively cool zone 38 is adjacent the outlet 112. A relatively hot zone 36 is adjacent the first end 104 and adjacent at least a portion of the opening 24 of feed tube 20. Accordingly, the furnace 34 encompasses at least a portion of the reactor 100, the opening 24 of the feed tube 20 and a portion of the chamber 102 adjacent thereto. This arrangement provides the temperature zones which facilitate fiber growth and provide excellent fibers when the methane, ammonia, hydrogen sulfide, and iron carbonyl reactants are used.

Examples 1 and 2 describe formation of carbon fibers during a growth period of several minutes, typically three to four minutes. The fibers were carefully removed from the bottom of the tube near position 54, collection vessels 58A, 58B and trap 59. The material collected was weighed and its apparent density was computed after estimating the volume of the material using a beaker. From these density measurements it was easy to distinguish soot from fibers. Our soot, despite being constructed of chained spheres of density near 2 grams per cubic centimeter ($g/cm^3$ or gm/cc) had an apparent density near 0.04 $g/cm^3$. Fibrous material, however, was much less dense; it was below 0.01 $g/cm^3$. Fibers with no admixture of soot had a superficial density below 0.001. As average fiber length increased, the superficial density correspondingly decreased. The fluffiest material we have produced has a density near 0.0002 g/cc, although it may be easily compressed to many times that density for storage and handling. Thus, apparent density determination is a very useful screening method for discriminating between fibers and soot; low densities always correlated with higher quality fibers.

EXAMPLE 1

The apparatus 10 of the invention as shown in FIG. 1 was used to form carbon fibers. The apparatus 10 included a reactor 12 of a mullite material defining a 13 centimeter ID reaction chamber 14 and a feed tube 20 of mullite with a 19 mm ID. The closed end 16 of the reactor 12 extended about 102 cm into the furnace 34. The feed tube 20 was extended into the reactor chamber 14, so that the opening 24 of the feed tube 20 was spaced about 7 centimeters from the reactor closed end 16. In this position the feed tube 20 extended about 94 cm into the chamber 14.

In the first step, helium gas at a flow rate of 155 cc/min was supplied by compression and flow control system 41 to reservoir 42 through line 43. In reservoir 42, the helium was bubbled through liquid iron pentacarbonyl at 22° C. The helium/carbonyl gas stream flowed into lines 44 and 46. Next, a reactant gaseous stream of methane and ammonia was supplied from controller 39 through line 40. The helium/iron carbonyl gas mixture in line 46 and gaseous reactants supplied through line 40 were mixed at tee 48 before entering reactant feed tube 20. The gaseous reactants in line 40 were methane, ammonia, hydrogen sulfide at 6 cc/min, and the iron pentacarbonyl in helium at 155 cc/min, with a total flow rate of about 6.6 liters per minute (l/min).

The relative amounts of methane and ammonia were varied, and the amounts of hydrogen sulfide and iron pentacarbonyl were maintained constant. The methane content (relative to ammonia) ranged from near 0% to near 100%, that is, ammonia-rich to methane-rich.

The flow of reactants and growth of fibers continued for about four minutes at a temperature of about 1050° C. to 1120° C. The reactor was then purged by nitrogen using several short bursts supplied at 60 psig through line 20. The reactor was then purged with oxygen in air to oxidatively remove any carbonaceous material including fibers and other unreacted constituents. The oxidizing purge utilized air at a flow rate of 5.0 l/min for about three minutes, supplied through line 20.

The process was repeated over three four-minute growth periods, during which the yield of fibers produced was maintained at a consistently high level of about 24% to 40%. There was no reduction in fiber quality during the period. That is, fibers averaging about 0.2 micrometers ($\mu m$) in diameter and about 40 micrometers ($\mu m$) in length and about 0.0005 to 0.001 gm/cc were consistently formed at a consistently high yield.

The effects of varying the amounts of methane and ammonia are displayed in FIG. 5. Data for the vertical reactor are shown as filled circles. The filled circular data point near the "$NH_3$" arrow represents a methane flow rate of 2860 cc/min and an ammonia flow rate of 3740 cc/min, giving an atomic ration of:

$$C/(H + N) = \frac{2860}{4 \times 2860 + 4 \times 3740} = 0.108$$

When 100% $CH_4$ (no $NH_3$) was used, fiber quality was reduced as evidenced by a corresponding increase in density. (See extreme right triangular data point where $C/(H+N)=0.25$, corresponding to $C=1$, $H=4$, and $N=0$, i.e. no ammonia).

EXAMPLE 2

The apparatus 10 which included a horizontal reactor as shown in FIG. 2 was used to form carbon fibers in a preferred method. The method used was similar to that of Example 1, except that the gaseous mixture flowed in a generally horizontal direction through feed tube 20, expanded into chamber 102 and flowed out through exhaust line 120 at outlet 112 of chamber 102.

The gaseous reactants were supplied at a rate of about 6.0 l/min, and included hydrogen sulfide at 13 cc/min and an iron pentacarbonyl saturated stream of helium at 137 cc/min. Mixtures of methane and ammonia constituted the balance of the gas reactant mixture, with the total flow rates close to 6.0 l/min.

Fibers were formed for a period of about four minutes followed by a short forced purge with air for one to three minutes. Air was supplied at 45 psi.

Table 1 summarizes four different experimental series, each performed with a different ratio of methane to ammonia. Each experiment comprised from 8 to 32 repetitions of the steps above, during which the yield and fiber density were recorded. The yield can vary from 15% to 23%, depending on the methane to ammonia ratio.

Figure 3:
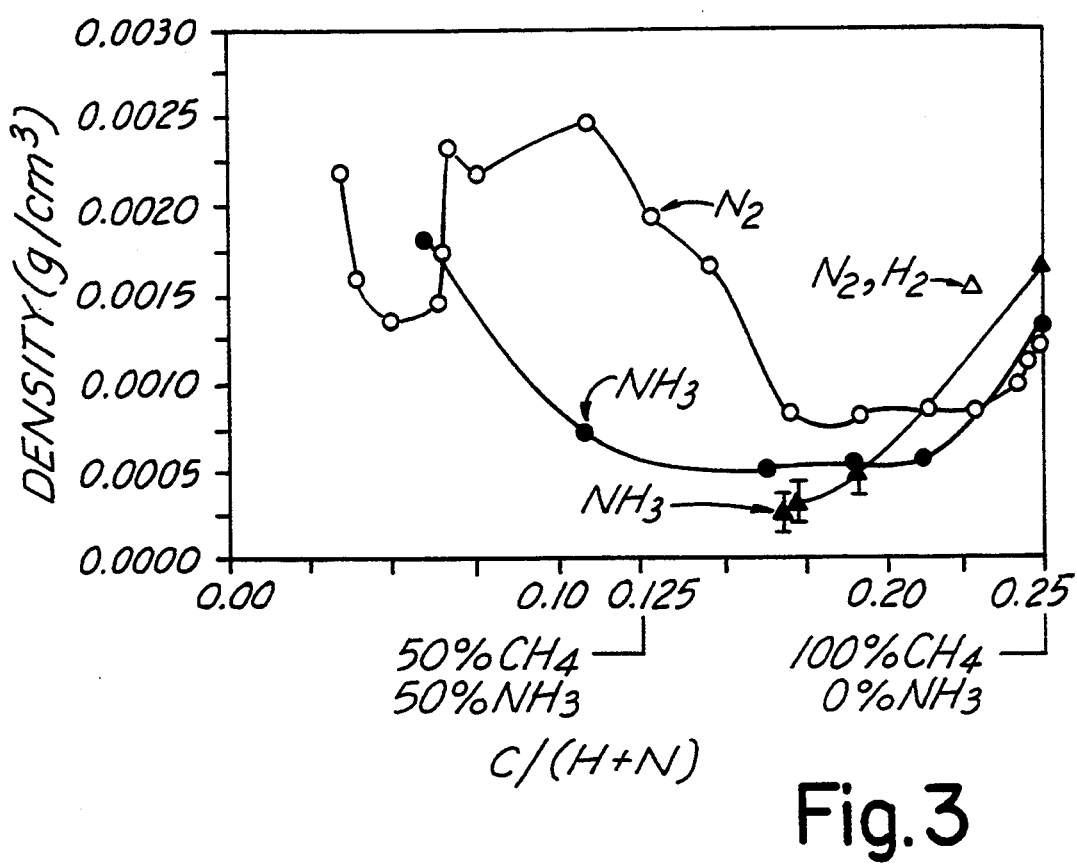
FIG. 3 is a plot of superficial bulk density of fibers (a rough measure of fiber quality) as a function of the carbon, hydrogen, and nitrogen reactant constituents.

The effects of varying the amounts of methane and ammonia are displayed in FIG. 3, where the filled triangles represent data for the horizontal reactor, as shown in Table 1.

In both reactors, the best fibers were formed in the range of $C/(H+N)$ of 0.1 to 0.2. This corresponds to a molar ratio of $CH_4$ to $NH_3$ of about 1:1 to about 3.25:1. This range will change only slightly when natural gas having a high methane content is used (i.e., methane content of at least 90 volume %). Fibers formed at various $CH_4$:$NH_3$ ratios had characteristics as shown in Tables 1 and 2.

TABLE 1

| | | | Horizontal Reactor Operated as Per Example 3 | | | | |
| | | | Apparent Density* (gm/cm³) | | | Fiber Diameter Microns | |
| $CH_4/NH_3$ Ratio | $C/H + N$ | No. of Samples | Average | Standard Deviation | Yield % | Average | Standard Deviation |
|---|---|---|---|---|---|---|---|
| 3.25 | 0.191 | 14 | 4.8 | 0.84 | 23.3 ± 4.3 | 0.19 | 0.05 |
| 2.2 | 0.172 | 20 | 3.1 | 0.60 | 19.8 ± 3.4 | — | — |

TABLE 1-continued

| | | | Horizontal Reactor Operated as Per Example 3 | | | Fiber Diameter Microns | |
|---|---|---|---|---|---|---|---|
| | | | Apparent Density* (gm/cm$^3$) | | | | |
| CH$_4$/NH$_3$ Ratio | C/H + N | No. of Samples | Average | Standard Deviation | Yield % | Average | Standard Deviation |
| 2.0 | 0.166 | 32 | 2.6 | 0.81 | 19.4 ± 2.5 | — | — |
| 1.3 | 0.141 | 8 | 2.9 | 0.53 | 15.5 ± 1.4 | 0.22 | 0.036 |

*Apparent density in grams per cm$^3$ expressed in ten thousandths (i.e., 4.8 represents a value of 0.00048)
Note:
The molar ratio of CH$_4$ to NH$_3$ is essentially equivalent to the ration of C to N.

TABLE 2

| Example # | ID of Reactor (cm) | Orientation of Reactor | Average Yield | Product Density (grams/cc) |
|---|---|---|---|---|
| 1 | 13 | vertical | >20% | 0.0004 to 0.0015 |
| 2 | 10 | horizontal | 15% to 23% | 0.0002 to 0.0015 |
| Comparative Examples A & B | 13 | vertical | — | 0.0008 to 0.0018 |

Note:
1. > indicates value is greater than number shown.
2. 19 mm ID mullite feed tube used in all cases.
3. Density shown at optimum ratio of C:H in each case.

The molecular weights of ammonia and methane are close, at 16 and 17, respectively. Thus, the amount of hydrogen sulfide and iron pentacarbonyl may be expressed as a function of total mass of reactant gas, even though the relative amounts of NH$_3$ and CH$_4$ may vary. We prefer to use 0.2 grams of H$_2$S and 0.4 grams of Fe(CO)$_5$ for each 100 grams of methane and ammonia combined. Comparison trials without ammonia are described in the following Comparative Examples.

COMPARATIVE EXAMPLE A

The method of Example 1 was used except that the ammonia was replaced with a gaseous mixture containing one part nitrogen (N$_2$) to three parts hydrogen (H$_2$). The hydrogen sulfide and iron pentacarbonyl saturated helium flow rates were similar to Example 1. The methane flow rate was decreased to 3.75 l/min, while the N$_2$ and H$_2$ mixtures flowed at 912 cc/min, giving a C/(N+H) of 0.22. Poor quality fibers and soot were produced having a density of 1.6 to 10$^{-3}$. This point is represented as the open triangle in FIG. 3.

COMPARATIVE EXAMPLE B

The method of Example 1 was used except that the ammonia was replaced by nitrogen. As FIG. 3 shows, for every mixture studied, the fibers were clearly of higher density and, therefore, of lower quality than the fibers grown from ammonia/methane mixtures.

The features of the comparative examples exhibited a density which was about two to four times as great as that of Examples 1 to 3. The diameter of the comparison fibers was highly variable at 0.25 microns with a standard deviation of 0.20 microns.

The surfaces of the fibers of Examples 1 and 2 were analyzed to determine their composition with x-ray electron spectroscopy. In each case, carbon constituted over 90% by weight of the fiber. Nitrogen was present in an amount up to about 3%. Other detectable constituents were sulfur and oxygen. Oxygen is, of course, incorporated in the Fe(CO)$_5$ (iron pentacarbonyl).

Although not wishing to be limited to any particular theory, we believe the following is the theoretical explanation of fiber formation in the apparatus of the invention. Ferrocene or iron pentacarbonyl decompose and nucleate into iron particles in the feed tube 20. Microscopic carbon filaments can grow from nuclei of iron and have a diameter of about 35 nm. This is believed to be the optimum nucleus size for growing fibers. In the carbon-rich environment within the reactor 12 and reactor 100, it is likely that carbon filaments (fiber precursors) lengthen for a relatively short time before each nucleus is buried by excess carbon products. Filament lengthening should not be appreciable in the feed tube 20 because the tube may become blocked. The lengthening period is always, of course, less than the period of time each nucleus spends in the reactor 12, 100. Once the filaments reach the larger diameter chamber 14, 102, their linear flow (velocity) slows down, and the filaments may thicken for a relatively longer period of time, forming fibers in chamber 14, 102 before they reach the outlet 18, 112. It is thought that nitrogen atoms are readily decomposed from ammonia in the reactor. Nitrogen is then strongly absorbed on the fiber, as evidenced by x-ray photoelectron spectroscopy with nitrogen constituting up to about 5% of the surface atoms of the fiber. It is expected that nitrogen improves wettability and surface reactivity of the fibers. This improves the quality of composites formed from the fibers.

The comparative examples demonstrated that the best fibers were formed from NH$_3$ and not from mere inclusion of N$_2$ in a reactant stream. Stoichiometric portions of N$_2$ and H$_2$ produced markedly lesser quality fibers, as compared to NH$_3$.

Conveniently, we used natural gas as the source of carbonaceous material. Natural gas with a relatively high proportion of methane and ethane is preferred. Methane and natural gas may also be used in place of more expensive helium for dispersion of iron pentacarbonyl. That is, methane and/or natural gas may be bubbled through the reservoir containing iron pentacarbonyl. Methane and ammonia may be supplied separately or combined together. In either case, the preferred ratio of CH$_3$ to NH$_3$ is 1:1 to 3:1. Other factors which contributed to the formation of acceptable fibers included providing at least one molecule of hydrogen sulfide sulfur for every molecule of iron, and providing a sufficiently high temperature in the reactor. Below 1000° C., dense sooty material was produced. Over 1050° C., the desired low density microscopic fiber material were produced. The apparatus 10 could not be operated at a hot enough temperature to define a clear maximum temperature of fiber growth. Generally, as the temperature increased, there was an increase in the yield of fibers. However, this increase in yield was accompanied by an increasing tendency toward inlet tube clogging. Some of the nuclei are incidentally deposited on the inner surface of the inlet tube where they can catalyze the growth of filaments. Because the nuclei remain fixed in the reactor, they can grow fibers of extraordinary length, ultimately blocking the inlet tube. As they increase in length, they form a porous, intertwined filter which can remove catalytic particles from the inlet stream, drastically decreasing the yield. The oxidative purge burns the intertwined carbonaceous material to render the reactor productive once again.

Densities of fibers produced under the optimized conditions of Examples 1 and 2 are as presented in Tables 1 and 2. As can be seen, the invention provides fibers of high quality formed when ammonia is included in the reactant gas mixture. Fibers formed with ammonia have an apparent bulk density less than 0.001 gm/cc and a low as 0.0001 to 0.00005 gm/cc. Fibers formed with ammonia also have greater length and more uniform diameters than fibers formed with only the carbonaceous (hydrocarbon), nuclei, and sulfide constituents. Fibers formed with ammonia have diameters in a relatively narrow range of 0.19 to 0.22 microns with a standard deviation of only up to 0.05 microns. The low bulk density, greater length, and relatively uniform diameters of these fibers result in greater strength.

While this invention has been described in terms of certain embodiments thereof, it is not intended that it be limited to the above description, but rather only to the extent set forth in the following claims.

The embodiments of the invention in which an exclusive property or privilege is claimed are defined as follows:

1. In a process for preparing carbon fibers in a gaseous phase reaction in a reactor, the improvement comprising:
   a) forming a mixture consisting essentially of a gaseous hydrocarbon, ammonia, hydrogen sulfide, and an iron-containing compound decomposable to form iron nucleation sites, the hydrocarbon being selected from the group consisting of methane, high methane natural gas having a methane content of at least 90 volume percent, and mixtures thereof; the hydrocarbon and the ammonia each being present in an amount sufficient to provide a ratio of carbon atoms (C) to nitrogen atoms (N) in a range of about 1:1 to about 3:1;
   b) heating the mixture in the reactor for a time and at a temperature sufficient to cause decomposition of the decomposable compound to form particles of nanometer size iron nucleation sites dispersed and entrained in the gaseous mixture which induce growth of carbon fibers and to thereby form carbon fibers having an average diameter of about 0.05 to about 0.5 micron and containing carbon and nitrogen; and
   c) substantially continuously recovering the carbon fibers.

2. The process according to claim 1, wherein the decomposable compound consists essentially of iron pentacarbonyl dispersed in a carrier.

3. The process according to claim 1, wherein the hydrogen sulfide is present in an amount at least as great as the amount of the iron in the decomposable compound.

4. The process according to claim 2, wherein the the carrier gas is helium.

5. The process according to claim 1, wherein the temperature of step (b) is at least about 1050° C.

6. A process of continuously forming carbon fibers in a reactor by the steps consisting of:
   a) forming a mixture consisting essentially of a gaseous hydrocarbon, a compound decomposable to form iron nucleation sites, a gaseous sulfur-containing compound and ammonia, and flowing the mixture through the reactor at a first pressure; the hydrocarbon being selected from the group consisting of methane, natural gas having a methane content of at least 90 volume percent, and mixtures thereof, the hydrocarbon and the ammonia each being present in an amount sufficient to provide a ratio of carbon atoms (C) to nitrogen atoms (N) in a range of about 1:1 to about 3:1;
   b) heating the mixture in the reactor for a time and at a temperature sufficient to cause decomposition of the decomposable compound to form particles of nanometer size iron nucleation sites dispersed and entrained in the gaseous mixture which induce growth of carbon fibers and to thereby form carbon fibers having an average diameter of about 0.05 to about 0.5 micron and containing carbon and nitrogen; and
   c) intermittently interrupting the flow of the mixture of step (a) and, during the interruption, flowing an inert gas selected from the group consisting of helium, argon, and nitrogen through the reactor at a pressure sufficient to forcibly move at least a portion of any of the fibers plugging the reactor out of the reactor, and then flowing an oxygen-containing gas through the reactor for a time and at a temperature sufficient to oxidize at least a portion of any unreacted or partially reacted material in the reactor; and
   d) recovering the fibers formed in the reactor.

7. The process according to claim 6, wherein the mixture of step (a) comprises:
   the decomposable compound consisting essentially of iron pentacarbonyl dispersed in a carrier; and
   the gaseous sulfur-containing compound consisting essentially of hydrogen sulfide in an amount at least as great as the amount of iron in the iron pentacarbonyl.

8. The process according to claim 7, wherein the carrier gas is helium.

9. The process according to claim 6, wherein the inert gas is nitrogen.

10. The process according to claim 6, wherein the temperature of step (b) is at least about 1050° C.

11. A process of continuously forming carbon fibers in a reactor by the steps consisting of:
   a) forming a mixture consisting essentially of a gaseous hydrocarbon, a compound decomposable to form iron nucleation sites, a gaseous sulfur-containing compound and ammonia, and flowing the mixture through the reactor at a first velocity; the hydrocarbon being selected from the group consisting of methane, natural gas having a methane content of at least 90 volume percent, and mixtures thereof, the hydrocarbon and the ammonia each being present in an amount sufficient to provide a ratio of carbon atoms (C) to nitrogen atoms (N) in a range of about 1:1 to about 3:1;
   b) heating the mixture in the reactor for a time and at a temperature sufficient to decompose the decomposable compound to form particles of nanometer size iron nucleation sites dispersed and entrained in the gaseous mixture which induce growth of carbon fibers and to thereby form carbon fibers having an average diameter of about 0.05 to about 0.5 micron and containing carbon and nitrogen;

c) changing the velocity of the flowing mixture with the particles entrained therein to a second velocity less than the first velocity to enhance fiber growth on the particles;

d) intermittently interrupting the flow of the mixture of step (a) and, during the interruption, injecting one or more pulses of air through the reactor at a pressure sufficient to forcibly move at least a portion of any of the fibers plugging the reactor out of the reactor, and for a time at a temperature sufficient to oxidize at least a portion of any unreacted or partially reacted material in the reactor; and e) recovering the fibers formed in the reactor.

12. The process according to claim 11, wherein the mixture of step (a) comprises:

the decomposable compound consisting essentially of iron pentacarbonyl dispersed in a carrier; and the gaseous sulfur-containing compound consisting essentially of hydrogen sulfide in an amount at least as great as the amount of iron in the iron pentacarbonyl.

13. The process according to claim 12, wherein the carrier gas is helium.

14. The process according to claim 11, wherein the temperature of step (b) is at least about 1050° C.

* * * * *